Dec. 14, 1954  B. A. VANDER HEYDEN  2,696,729
CEMENTITIOUS PLANK AND METHOD OF CONSTRUCTING IT
Filed June 19, 1944  3 Sheets-Sheet 1
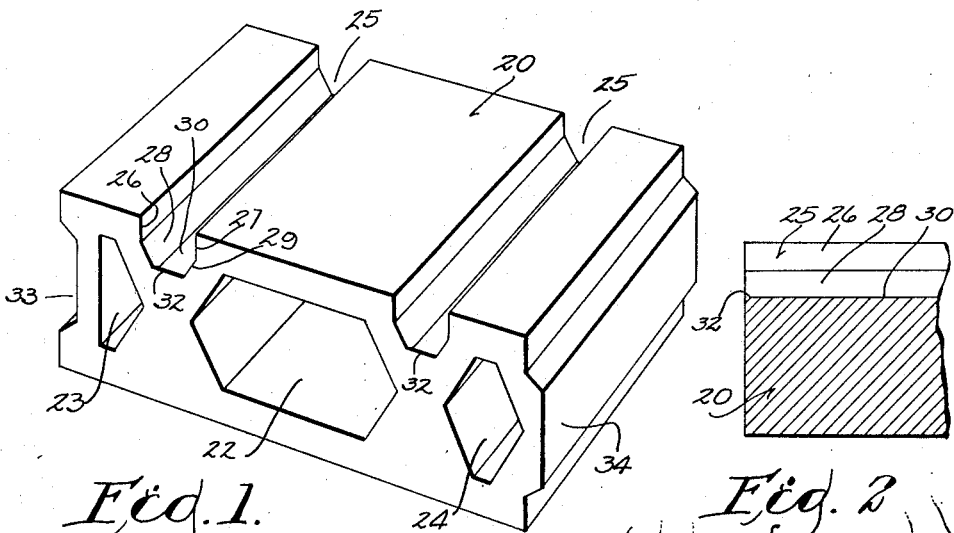
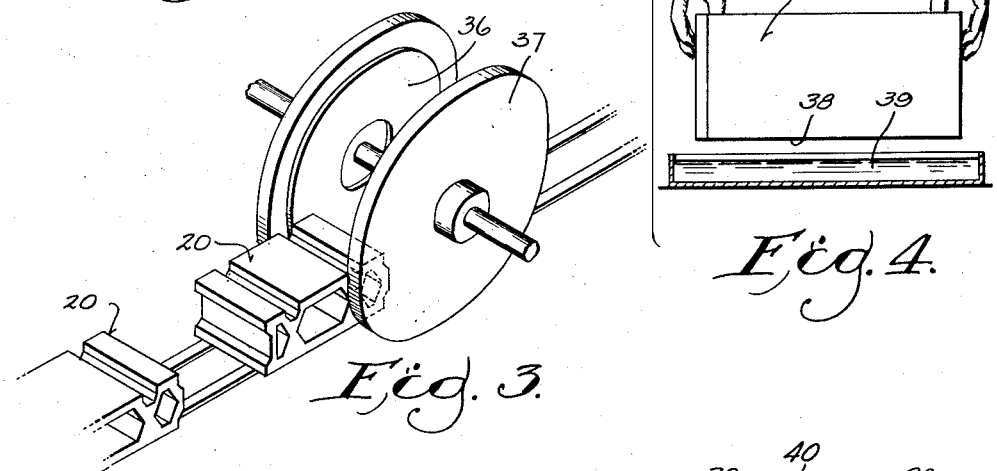
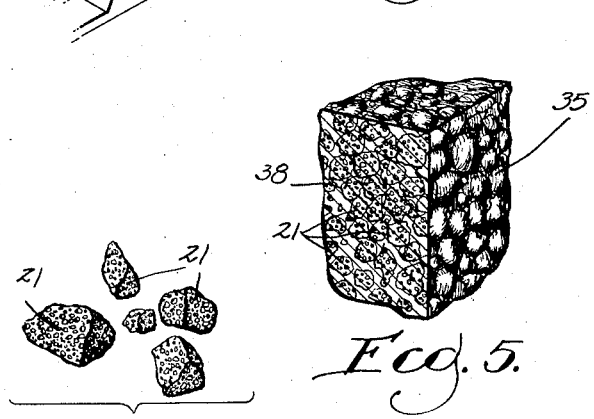
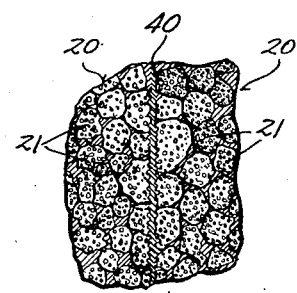
INVENTOR
BERNARD A. VANDER HEYDEN
BY
Wheeler, Wheeler & Wheeler
ATTORNEYS.

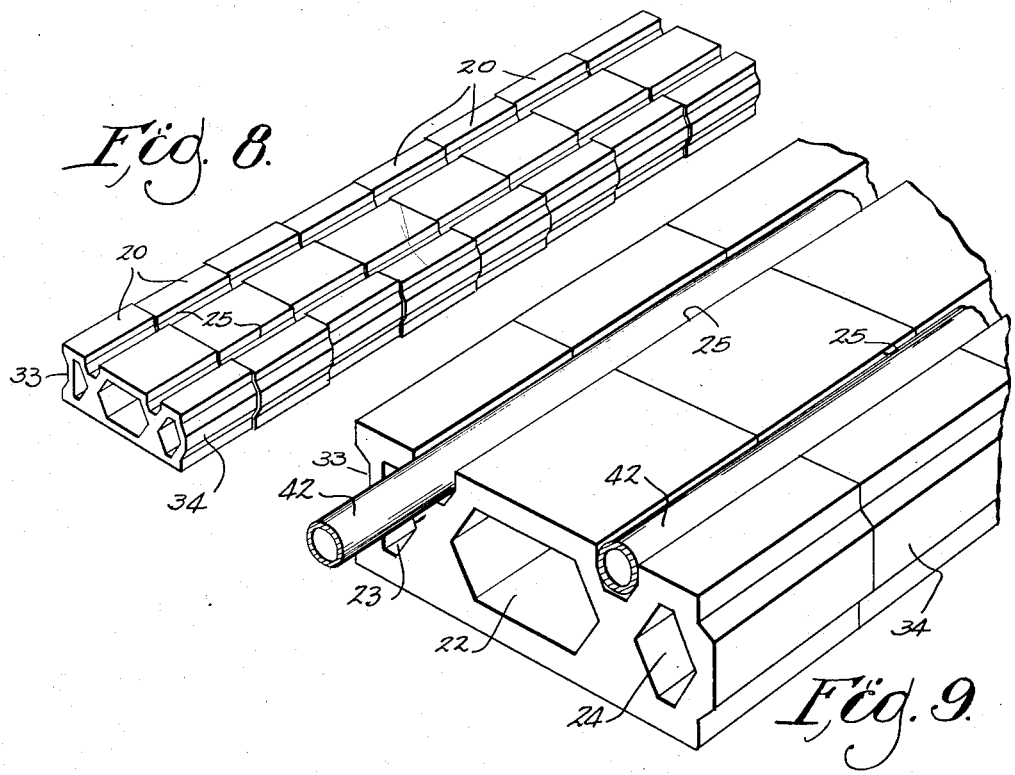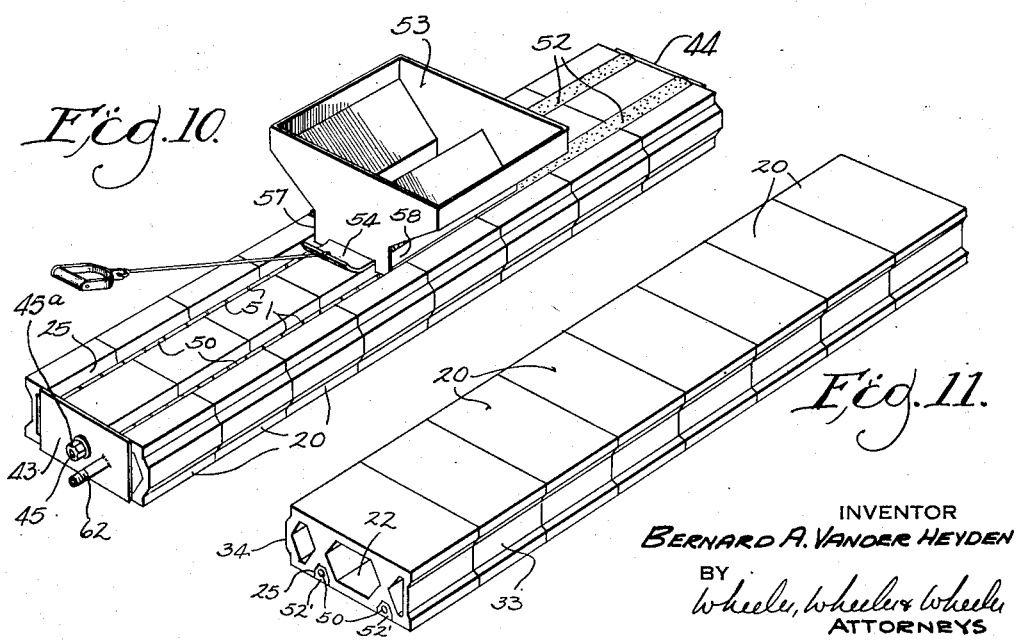

Dec. 14, 1954  B. A. VANDER HEYDEN  2,696,729
CEMENTITIOUS PLANK AND METHOD OF CONSTRUCTING IT
Filed June 19, 1944  3 Sheets-Sheet 3

INVENTOR
BERNARD A. VANDER HEYDEN
BY
Wheeler, Wheeler & Wheeler
ATTORNEYS.

United States Patent Office 2,696,729
Patented Dec. 14, 1954

2,696,729

CEMENTITIOUS PLANK AND METHOD OF CONSTRUCTING IT

Bernard A. Vander Heyden, West Allis, Wis., assignor to The Whitacre-Greer Fireproofing Company, Waynesburg, Ohio, a corporation of Ohio Application June 19, 1944, Serial No. 540,966

13 Claims. (Cl. 72—61)

This invention relates to improvements in cementitious planks and methods of constructing them.

The present application is a continuation in part of my application 487,299, filed May 17, 1943 and entitled Cementitious Planks and Methods of Forming Them.

It is the object of the invention to provide a strong but light and porous cementitious plank combining great strength with a high thermal and acoustical insulation factor which, together with its light weight, adapts it for the making of roofs and floors, and the like.

More particularly, the objects of the invention include the provision of a plank which may be made up in any reasonable length by assembling and connecting cemenetitious blocks; the provision of a plank which may be adjusted after completion to correct sagging or to create an arch; the provision of a cementitious plank constructed of blocks made of relatively soft and porous aggregate, and in which the plank will have great strength by distributing compression stress throughout the individual blocks instead of concentrating it upon the end blocks of the series; the provision of novel and expeditious means of aligning the several blocks for assembly to constitute my improved plank; the provision of a novel block structure for supporting at an exactly predetermined level the tension rods which connect the blocks in the completed plank; the procedure whereby the tension rods are subjected to an initial degree of tension in the construction of the plank; and various other details of method and product as will appear more fully from the following disclosure.

Another object of my invention is to provide a load bearing structural unit having elements or portions bonded together in the unit that are adapted to be loaded in tension and compression respectively when the unit is loaded and which before the unit is loaded are respectively stressed in tension and compression, i. e., are prestressed. A more specific object is to provide such a unit in which in its preferred form the tension element or portion, has its state or condition of prestress developed in it by a transfer of stress from the compression element or portion through the bond after the respective elements or portions are bonded together. Another object is to provide a prestressed structure with both tension and compression elements bonded together and stressed before load in which the tension element, such as the reinforcing rods, may take a form that is difficult, costly or impossible to stress except through its bond with the compression element. Specifically an object is to provide a slab or plank of a plurality of blocks in pre-compression and one or more reinforcing rods in pre-tension with the rods bonded to the blocks as by a cement grout bond but with the rod or rods having no parts extending beyond the blocks or grout and not threaded at their ends or otherwise treated or gripped for tensioning and not tensioned except through the bond with the blocks. Another object is to provide a load bearing slab or unit pre-stressed in the sense of having its tension and compression portions stressed before being loaded in the way they will be stressed under load and which may be severed into smaller units or parts which retain the character and prestress and load bearing ability of the initial slab or unit. Other objects include the provision of methods of making the slabs, planks or units mentioned above. It is also among the objects of my invention to provide a preferred method of making such prestressed slabs, planks or units which before being loaded have one portion stressed in compression and another portion bonded thereto and stressed in tension by the steps of first stressing the compression portion in compression independently of the tension portion, bonding the tension portion in an unstressed state to the stressed compression portion and then transferring stress from the compression portion to the tension portion through the bond between the portions. Another object is to provide a method of making a composite pre-stressed slab, plank or other load bearing unit of a compression portion and a tension portion bonded or otherwise secured together in mutually opposing coaction in which one of the portions, such as a reinforcing rod, taken alone is difficult, costly or impossible to pre-stress.

In the drawings:

Figure 1 is a view in perspective of a cementitious block which serves as a unit from which my improved plank is constructed.

Figure 2 is a fragmentary detail in the longitudinal section through the block shown in Figure 1.

Figure 3 is a view in perspective showing a procedure to which the blocks are optionally, but preferably, subjected.

Figure 4 is a view partially in side elevation and partially in section showing another optional but preferred procedure in the treatment of the individual blocks prior to their assembly in the plane.

Figure 5 is an enlarged fragmentary detail view in perspective showing one corner of a block which has been ground off in accordance with the disclosure of Figure 3.

Figure 6 is a detail view in perspective showing individual pieces of the aggregate from which such blocks are constructed.

Figure 7 is a detail view in transverse section fragmentarily illustrating the juncture between two blocks which have been treated in accordance with the disclosure of Figure 4.

Figure 8 shows in perspective a row of blocks associated preliminary to the construction of a cementitious plank therefrom.

Figure 9 is an enlarged detail view in perspective showing the procedure by which the blocks shown in Figure 8 are aligned.

Figure 10 is a view showing in perspective the procedure by which the aligned blocks are jointed ot constitute a cementitious plank.

Figure 11 shows in perspective a completed cementitious plank embodying the invention.

Like parts are identified by the same reference characters throughout the several views.

Figure 12:
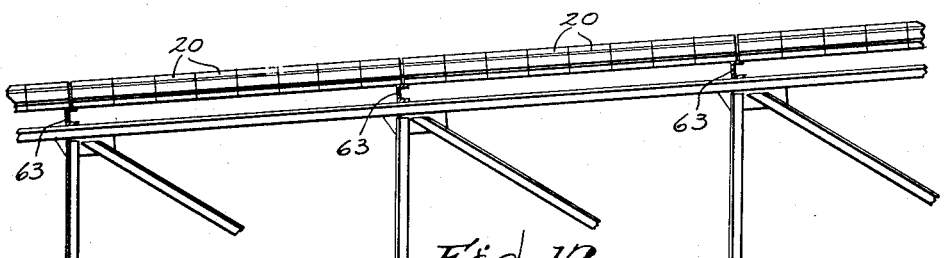
Figure 12 shows in side elevation how the cementitious plank of Figure 11 may be used in the construction of a roof.

Although the cementitious blocks of which my cementitious planks are fabricated are made of known materials, they have some novel structural characteristics; and novel advantage is taken of the qualities of the materials used.

The individual block 20 is porous and light in weight. It may be made of cinder concrete to achieve some of these advantages, but I prefer to use a crushed slag, particles of which are shown at 21 (see Figures 5, 6 and 7), bonded with cement and water, and without the use of any sand. The porosity of the individual particles 21 provides an excellent bond, while at the same time contributing to the lightness in weight and thermal insulation qualities which are desirable factors of the resulting block 20.

In molding the block, I provide, in addition to the usual openings 22, 23, 24, parallel channels 25, each of which has parallel side walls 26, 27, beveled walls 28, 29, and a bottom 30. The channels are uniform in depth, except that the core portion of the mold by which they are formed is cut away at one end to leave a rib 32 spanning each channel adjacent one end face of the block, Figure 2.

The side faces of the block may have tongue and groove formations, as indicated at 33, 34.

Because more coarse than fine material is used in the cementitious mix from which the blocks 20 are molded, their exposed surfaces are all quite rough, as indicated at 35 in Figure 5. I may, therefore, grind these end faces smooth to eliminate projecting portions of the bits of aggregate 21 by passing the block across one or more grinding wheels 36, 37, as shown in Figure 3. The ground face of the block is indicated at 38 in Figure 5, and it will be noted that the grinding has exposed the inherently porous character of the particles of aggregate, whereas in the face of the molded block as shown at 35 such particles are all covered with at least a wash of cement.

As indicated above, the grinding step is optional.

It is illustrative, however, of one desirable way to facilitate "bonding" the adjacent ends of the blocks to each other to transmit and distribute the compression load evenly between substantially all increments of area of the juxtaposed end surfaces of the blocks that are intended to be similarly loaded either in the first instance or when the finished slab is in use. I thereby avoid local concentrations of load at and near high spots in the abutting or juxtaposed end surfaces of the blocks and develop the full strength of the blocks and/or the portions thereof that are put in compression during the times of manufacture of the slab or plank and/or while the slab or plank is in use as a load bearing structural unit. Various of the reasons for and results and advantages of grinding the abutting or juxtaposed end surfaces of the blocks as I may desirably employ that practice in my invention are described in greater detail in the U. S. Whitacre Patent Number 2,102,447.

Another optional step consists in the immersion of at least the ground face 38 of the block in a bath of cementitious grout 39, as indicated in Figure 4.

Sufficient grout will cling to the surface of the block to provide a bond as at 40 (Figure 7), between two contiguous blocks 20 which may be pressed together while the grout is still fresh.

Whether or not the procedures suggested in Figure 3 and Figure 4 are followed, any number of blocks required to make a cementitious plank of the desired length are laid end to end in a row on a platform or other plane surface. With the blocks in approximate alignment, aligning bars, conveniently comprising pipes 42 of a length greater than the series of blocks, are laid in the channels 25. The pipes are slightly smaller in external diameter than the width of the channels and they rest on the beveled surfaces 28, 29, near the bottoms of the channels. When the pipes have been positioned as indicated in Figure 9 and manipulated up and down and sometimes sideways, their engagement with the sides and bevels 28, 29 of the channels drawing all of the blocks into exact alignment. The flat shape of the block facilitates this operation. If the blocks were taller, they might tip rather than shifting bodily to alignment. The pipes are then removed.

Plates 43, 44 are applied to the end blocks of the series and connected under pressure by a bolt 45 extending through the aligned openings 22 of the several blocks and bearing on the pressure plates 43 and 44. I then tighten nut 45a on the threaded end of bolt 45 to place the entire group of aligned blocks under considerable compression between the pressure plates 43 and 44, see Figure 10. Having aligned and compressed the blocks longitudinally as described above, I place reinforcing rods 50 of steel, suitable to withstand the tension, in the channels 25, as shown in Figure 10, the rods being supported above the bottom surfaces 30 of the respective channels by the ribs 32 with which each block is provided. It will be noted that the rods 50 have the usual rings or flanges at 51 to assure adequate bonding. Thereupon, the blocks being still maintained under compression, the channels 25 are filled about the reenforcing rods 50 with grout 52 which embeds the rods and provides a perfect bond between the rods and the individual blocks. The crystallization, i. e. setting or curing, of the grout 52 will bond the reinforcing rods 50 to the grout and the grout in turn will be bonded to the blocks 20 while the blocks are under compression.

In this connection, it should be noted that it is very important to what I now believe to be the best practice of the present invention that the reenforcing rods be bonded to the blocks individually. The desired bond is best achieved where the surfaces of the channels 25 are either porous or irregular. The construction of my lightweight blocks provides both porosity and irregularity in these channels, and the cement mix deposited at 52 in the channels is bonded to the reenforcing rods by reason of their irregularity of surface, and to the individual blocks by reason of their irregularities so that no movement between the rods and the blocks is possible. I prefer to use fly ash and cement half and half to make this grout.

Figure 17:
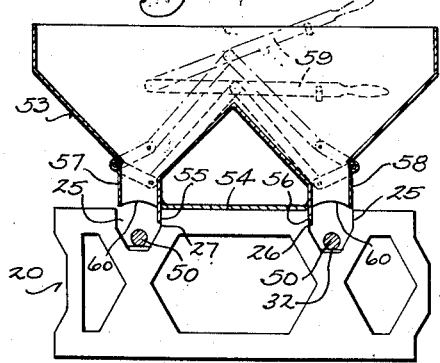
Figure 17 is a view partially in end elevation and partially in transverse section, showing details of the grouting hopper shown in Figure 10.
Figure 18:
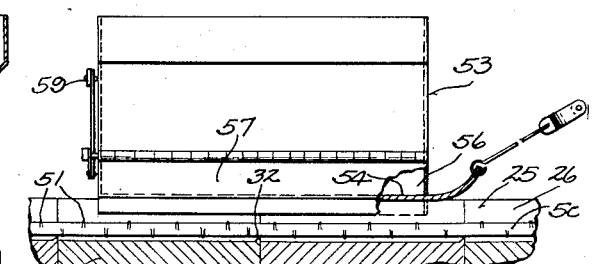
Figure 18 is a view, partially in side elevation and partially in longitudinal section, showing further details of the grouting hopper.

As a convenient means of filling the channels 25 with cementitious mix, I have provided the duplex hopper 53, which is shown in perspective in Figure 10 and shown in more detail in Figures 17 and 18. A central shoe at 54 supports the hopper from the block faces between the channels. The hopper is guided by the sides 55, 56, of the two discharge mouths. These sides ride against the face 26 of one channel and the face 27 of the other. Valve plates 57, 58, which may be opened and closed by lever 59, register with the opposing faces of the respective channels. The end wall of each discharge mouth is preferably upwardly arched at 60 so that the cementitious mix will somewhat more than fill the respective channels, as indicated in Figure 10 at 52. A single traverse of the assembled blocks will fill the channels 25. It is important that the mix be puddled by moving the rods or vibrating the whole assembly or otherwise. The mix will settle somewhat. Curing may be facilitated, if desired, by introducing steam through pipe 62 (Figure 10) into the aligned openings 22 of the series of blocks. After the cementitious mix at 52 has taken its initial set, any surplus may be scraped off flush with the surface of the blocks by a shovel or other tool.

When the grout bond between the rods and the blocks has been cured and/or become "set", I release the pressure that has been applied to and between the blocks and the row of blocks by the bolt 45 and nut 45a by loosening the nut 45a and removing the bolt 45 and the plates 43 and 44. The finished plank or slab having preferably theretofore been turned from the upside down position of Figure 10 to the right side up position of Figure 11 is then in readiness for use. The reinforcing rods 50 are all under considerable tension, since the bonding of the rods to the blocks was carried on while the blocks were under compression; tension in the rod 45 being transferred to the bonded rods 50 as the grip of the former upon the blocks is released. That is to say, both the tension and compression portions of the slab or plank are respectively in states of tension and compression throughout when the slab or plank is finished and ready for use, i. e. the finished unit as a whole is pre-stressed although only one of the portions thereof was stressed as by the bolt 45 during the making of the unit. Since, as I prefer, the rods are bonded throughout their whole lengths to all of the blocks throughout the whole lengths of each block, the whole compression and tension portions of the plank coact with and react upon each other throughout all their coextensive increments of length or extent. In this way I facilitate developing the full strength of all the constituent parts of the unit and I make it possible to sever a unit and retain in each of the severed fractions the load bearing virtues and characteristics, including pre-stress, of the whole original unit.

If the entire stress exerted by the tension rods 50 when the plank is loaded were imposed on the end blocks of the series, the ability of the resulting plank to stand up under load would be materially impaired. Due to the fact that the blocks are desirably porous for lightness of weight and thermal insulation, they would tend to crumple if subjected to undue compression or if the compression were unduly concentrated on any particular blocks. The present construction, therefore, makes use of the very porosity which weakens the blocks individually to produce a cementitious plank which is materially stronger than it could be but for such porosity.

The cementitious plank completed as above described is now inverted to position for use and then appears as shown in Figure 11. Unlike previous attempts to unite separate blocks to form a plank, my plank has flush ends. There are no projecting nuts or overhanging parts of any character. If the blocks have been freshly dipped, as suggested in Figure 4, they may be cementitiously bonded with each other at their end faces in the plank. However, the plank need have no such bond, as the bond provided between the tension rods and the individual blocks is entirely adequate to withstand all loads as to which any such plank will normally be subjected, the bonds between the ends of adjacent blocks, whether frictional, Figures 3 and 5, or cementitious, Figures 4 and 7, or otherwise having their being and functioning in the state of compression which is maintained and developed by the tension rods as above described. Tests have shown unexpectedly high strength.

To make a roof, the planks of the present invention need only be arranged side by side and end to end, their ends being supported on stringers 63 carried by a suitable supporting frame, as indicated in Figure 12.

Figure 13:
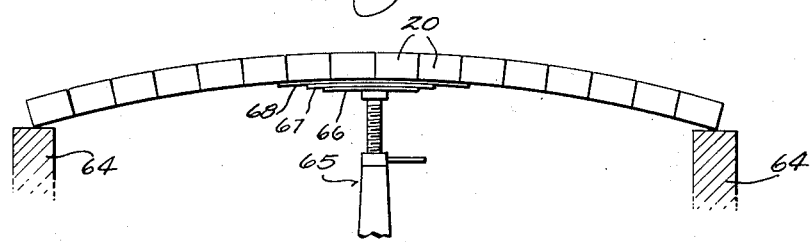
Figure 13 is a diagrammatic view, principally in side elevation, showing how a cementitious plank embodying the invention may be arched.

To make a floor, the cementitious planks of this invention need only be supported at their ends upon suitable walls, as indicated at 64 in Figure 13.

Figure 14:
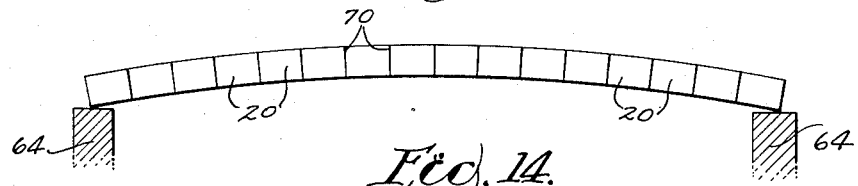
Figure 14 is a view similar to Figure 13, showing a cementitious plank in which the arch has been made permanent.

The planks may be crowned if desired. Or, if a plank sags for any reason, it may readily be levelled up by the procedure shown in Figure 13. The same procedure may be used to provide an arched plank for a roof or other purposes such as is shown in Figure 14. The technique is as follows.

Figure 15:
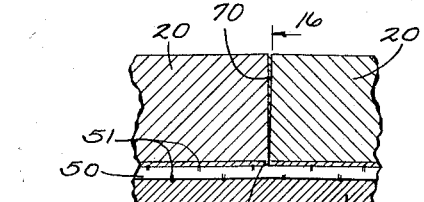
Figure 15 is a fragmentary detail view in longitudinal section through a cementitious plank embodying the invention.
Figure 16:
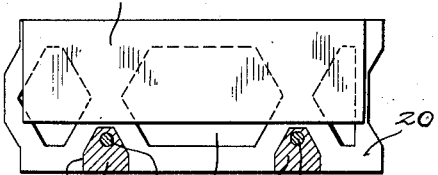
Figure 16 is a fragmentary detail view in transverse section on the line 16—16 of Figure 15.

A jack 65 is used to lift the central portion of the plank. Its lifting pressure is preferably transmitted through a series of springs 66, 67, 68 so as to be distributed over several blocks. It may be necessary to load the ends of the plank in order to make the plank arch as illustrated in Figures 13, 14 and 15. Due to the fact that the faces of the several blocks are not necessarily bonded with cement directly to each other in the ordinary practice of the invention, the sole adhesive connection between successive blocks may be effected through the tension rods 50 and the cementitious body 52' in which the tension rods are embedded (Figure 15). Not only will the rods be bent under pressure of the jack 65, but the cementitious bodies 52' in the channels 25 will also bend sufficiently to permit the blocks to separate slightly along their upper edges. Thereupon a shim 70 made of thin sheet metal, preferably dipped in asphalt for its protection, may be dropped between the exposed end surfaces of contiguous blocks to maintain their separation permanently as shown in Figure 15 and Figure 16. The jack may now be removed, and if a number of such shims have been used the plank may have a decided crown, as shown in Figure 14. If only one or two of such shims have been used, to crown the plank, the resulting floor or roof may be left perfectly level.

If the blocks are to be bonded by direct contact at their faces or in the planes thereof, any desired crown may be secured by grinding such faces slightly out of parallel. Or, the bond between the end faces of the blocks, whether frictional or cementitious, may be broken at any desired point where a shim is needed. Under some circumstances, cementitious mix may be allowed to set between the block faces to provide a cementitious shim instead of using a metallic shim.

After the several planks have been set together to span an opening between supports for the purpose of making any such structure as a floor or a roof, they may, if desired, be covered with a couple of inches of ordinary concrete, in which, if desired, pipes may be embedded for any building purpose. The resulting floor or roof will be found to compare favorably in cost with wood, being cheaper in many localities. It is also much stronger, and, in addition to its fireproof and acoustic value, it provides an important degree of thermal insulation, completely preventing the condensation and drip experienced in previous attempts to make concrete roofs.

The fact that the planks can be shaped after being completed to fit any desired requirements on the job, is another important and desirable characteristic. It will be apparent that by arching the individual planks, as shown in Figure 14, a roof having a Gothic arch can readily be made.

I claim:

1. A method of making an arched cementitious plank which comprises the assembly of cementitious blocks having channelled faces facing upwardly, aligning the several channels, placing tension elements in the channels, connecting the tension elements at least to the terminal blocks so aligned, inverting the series of blocks, producing relative upward movement of an intermediate portion of the series to flex it with respect to the end portions thereof, whereby to spread the faces of certain blocks of the series above the tension elements, and shimming the separated face portions of consecutive blocks to maintain the separation permanently, whereby to arch the resulting plank.

2. The method set forth in claim 1, which includes the steps of compressing and creating a state of compression in the assembly of blocks in the direction of said channels independently of said tension elements before connecting said tension elements, bonding the tension elements in said channels to substantially all the blocks of said assembly of blocks while said assembly is maintained in said state of compression, and releasing the said independently exerted compression upon said assembly before flexing said portion.

3. The method of making a load bearing slab which comprises assembling a row of a plurality of blocks having strength in compression and having smooth substantially planar end surfaces in contact with like surfaces of adjacent blocks in said row, laying tension means in the zone of tension of the slab longitudinally of said row and spanning said end surfaces and extending throughout substantially the whole length of said row, exerting compression forces longitudinally of said row independently of said means and compressing said blocks in tight end to end contact with each other on said surfaces, bonding said tension means substantially throughout its length to substantially all said blocks in said row while the blocks are compressed by said forces and thereafter releasing said forces and thereby tensioning said means.

4. The method of making a load bearing slab comprising assembling end to end a row of a plurality of blocks having major top portions disposed to be loaded in compression in the slab when the slab is loaded and having strength in compression at least in said portions and having their respective ends bonded to ends of adjacent blocks for even distribution of load therebetween, laying tension means longitudinally of said row throughout substantially the whole length of said row adjacent the bottoms of said blocks and spanning said ends, exerting compression forces longitudinally of said row independently of said means and creating a state of compression in and between said blocks and said portions thereof throughout said row, bonding said tension means to substantially all the blocks in said row while said blocks are in said state of compression, and thereafter releasing said independently exerted forces and thereby transferring part of the stress of said state of compression to said tension means and developing a state of tension therein.

5. The method of making a voided pre-stressed load bearing roof or floor slab comprising assembling in end to end contact a longitudinally extending row of voided blocks each having top and bottom walls, at least one connecting web and at least one downwardly facing longitudinally extending groove in the bottom wall below said web and having smooth end surfaces contacting like surfaces in adjacent blocks for evenly distributing a load between unit areas intended to be similarly loaded, laying tension means throughout substantially the length of said row in said grooves across said surfaces, disposing clamping means through the voids of the blocks and upon the ends of the slab, tensioning said clamping means and compressing said blocks longitudinally upon each other and on said surfaces by said clamping means and forcing said blocks into intimate tight end to end contact on said surfaces with substantially all increments of the areas thereof loaded with equal unit pressure, bonding said tension means in said grooves to each of said blocks, and, after said bonding is complete and secure, releasing and removing said clamping means and thereby transferring tension to said tension means and maintaining compression in said blocks.

6. The method of making a pre-stressed light weight concrete plank which comprises assembling in end to end contact a row of a plurality of small porous light weight homogeneously formed concrete blocks having smooth end surfaces with substantially all increments of area intended to be similarly loaded subjected to like unit pressure and each block being provided with parallel, outwardly facing, laterally spaced grooves having rough porous surfaces and constituting channels extending from end to end of the row of blocks, depositing reinforcing rods and cement grout in the channels and agitating the grout into intimate bonding contact with all surfaces of the rods and the adjacent surfaces of the channels, exerting compression forces longitudinally of said row of blocks and maintaining the row compressed until the said grout sets and securely bonds said rods to said blocks, and thereafter releasing said exerted compression forces from the row of blocks and thereby tensioning the rods and pre-stressing the whole plank.

7. The method of making a pre-stressed load bearing structural unit adapted to carry load as a beam supported at its ends and having longitudinally extending pre-formed compressible compression means and tension means both extending lengthwise substantially from end to end of the unit, which comprises disposing compressible compression means in longitudinal extension corresponding to the direction of the length of the unit to be made, disposing tension means in said direction adjacent to said compression means and extending substantially throughout the whole length of said compression means, exerting compression force in said direction on said compression means independently of said tension means and creating a state of longitudinal compression in said compression means, bonding said tension means substantially throughout its length to substantially the full length of said compression means while said compression means is compressed by said force, and thereafter releasing said force and thereby tensioning said tension means through the bond between said means.

8. The method of making a pre-stressed load bearing structural unit adapted to be loaded as a beam supported at its ends, which unit after having been made has a substantially longitudinally extending compression portion that is subjected to and resistant of compression in the direction of its length when the unit is loaded and is in a pre-compressed state before the unit is loaded and said unit has a second substantially co-extensive, longitudinally extending tension portion that is bonded to and coacts with the compression portion and is subjected to and resistant of tension in the direction of its length when said unit is loaded and is in a pre-tensioned state before the unit is loaded and said unit has a bonding element joining said portions and stressed in shear, comprising exerting a compression force upon said compression portion to compress said compression portion in the direction of its length in excess of its desired pre-compression while said compression and tension portions are detached from each other, bonding said compression and tension portions together by said bonding element while said compression portion is compressed by said force and while said tension portion is unstressed thereby, and after said portions are joined and bonded together by said bonding element, removing said force from said compression portion; said tension portion thereupon resisting decompression of said compression portion and being stressed in tension through shear in said bonding element.

9. The method of claim 3 wherein each block has at least one clear longitudinal opening extending from end to end between its end surfaces, with the steps of aligning said openings of the several blocks when the blocks are assembled in said row, placing said tension means in said aligned openings and bonding said tension means to said blocks by depositing bonding material in said aligned openings and around said tension means.

10. The method of claim 3 with the steps for arching the slab comprising positioning said slab with said tension means in the lower part thereof, producing upward movement of a midportion of the slab to flex it upwardly relative to the ends of the slab whereby to separate the upper portions of the said end surfaces of certain blocks above said tension means, and shimming the said separated portions of said end surfaces to maintain the separation between said portions permanently.

11. The method of making a load bearing slab adapted to carry load as a beam comprising assembling end to end a row of a plurality of blocks disposed to be loaded in compression in the slab when the slab is loaded and having strength in compression and having their respective ends bonded to ends of adjacent blocks for even distribution of load therebetween, disposing tension means longitudinally of said row throughout substantially the whole length of said row near the bottoms of said blocks and spanning said ends, exerting compression forces longitudinally of said row independently of said means and creating a state of compression in and between said blocks throughout said row, bonding said tension means to substantially all the blocks in said row while all said blocks are held in said state of compression, and thereafter releasing said independently exerted forces from said row of blocks; said tension means maintaining compression in said blocks and being stressed in tension in opposition to the compression in said blocks through the bond between said blocks and said tension means.

12. The method of claim 11 wherein each block has at least one clear longitudinal opening extending throughout its length near its bottom from end to end, with the steps of aligning the openings of the several blocks when the blocks are assembled in said row, disposing said tension means in said aligned openings and bonding said tension means to said blocks in said aligned openings.

13. A pre-stressed composite structural unit adapted to sustain load as a beam supported at its ends comprising in combination and in the absence of external load an elongated row of assembled and aligned separately pre-formed compressible blocks arranged end to end and having strength and elasticity in compression and having smooth substantially planar end surfaces in tight stressed load bearing engagement with like surfaces of adjacent blocks for even distribution of load therebetween, the said blocks being in a reduced state of compression compared with a next preceding higher state of compression within the elastic limit of the blocks and in a state of stressed elastic longitudinal expansion and elongation, tension means extending longitudinally throughout said unit adjacent said stressed and elongated blocks and being stressed in tension balancing said reduced state of compression in and between said blocks, and said tension means being in a state of tension substantially corresponding to the difference between said higher state of compression of said blocks and said reduced state of compression of said blocks, and said tension means being in an original state of maximum elastic elongation substantially equal to the aggregate longitudinal expansion and elongation of the said blocks in said row, and an elongated bonding element having a cross-sectional area of a fraction only of the cross-sectional area of the finished composite structural unit and having a composition differing from said blocks and from said tension means and characterized by its quality of adhesiveness to said blocks and said tension means and by its strength in shear, said bonding element adhering to substantially all said blocks in said row and to substantially the full length of said tension means and being stressed in shear between said blocks and said means and transferring the said difference between said higher and reduced states of compression of said blocks as tension to said tension member and elongating said tension means corresponding to the said elongation of said blocks.

References Cited in the file of this patent

UNITED STATES PATENTS

| Number | Name | Date |
| --- | --- | --- |
| 448,990 | Parrish | Mar. 24, 1891 |
| 461,028 | Lee | Oct. 13, 1891 |
| 604,708 | Burton | May 24, 1898 |
| 714,363 | Cleveland et al. | Nov. 25, 1902 |
| 1,400,284 | Hake | Dec. 13, 1921 |
| 1,470,401 | Sorensen et al. | Oct. 9, 1923 |
| 1,891,597 | Jagdmann | Dec. 20, 1932 |
| 2,044,382 | Dunagan | June 16, 1936 |
| 2,075,633 | Anderegg | Mar. 30, 1937 |
| 2,101,538 | Faber | Dec. 7, 1937 |
| 2,102,447 | Whitacre | Dec. 14, 1937 |
| 2,184,137 | Brewer | Dec. 19, 1939 |
| 2,193,380 | Price | Mar. 12, 1940 |
| 2,210,553 | Miller | Aug. 6, 1940 |
| 2,234,114 | Gifford | Mar. 4, 1941 |
| 2,413,990 | Muntz | Jan. 7, 1947 |
| 2,455,153 | Abeles | Nov. 30, 1948 |

FOREIGN PATENTS

| Number | Country | Date |
| --- | --- | --- |
| 126,100 | Great Britain | of 1919 |
| 51,321 | Sweden | of 1922 |
| 133,732 | Switzerland | of 1929 |
| 338,864 | Great Britain | of 1930 |
| 348,237 | Great Britain | May 14, 1931 |
| 307,549 | Italy | of 1933 |
| 471,226 | Great Britain | Aug. 31, 1937 |
| 372,693 | Italy | of 1939 |
| 56,259 | Denmark | of 1939 |
| 556,572 | Great Britain | Oct. 11, 1943 |